United States Patent [19]
Uno et al.

[11] Patent Number: 5,785,627
[45] Date of Patent: *Jul. 28, 1998

[54] TORQUE FEEDBACK SHIFT CONTROL DEVICE AND METHOD

[75] Inventors: Shigeo Uno, Tokyo; Masahiko Ibamoto, Ibaraki; Mitsuhiro Masuda, Ibaraki; Kazuhiko Sato, Ibaraki; Susumu Sato, Ibaraki; Hiroshi Kuroiwa, Ibaraki; Mitsuyoshi Okada, Ibaraki, all of Japan

[73] Assignees: Hitachi, Ltd.; Hitachi Automotive Engineering Co., Ltd., both of Japan

[*] Notice: The term of this patent shall not extend beyond the expiration date of Pat. No. 5,613,920.

[21] Appl. No.: 752,181

[22] Filed: Nov. 18, 1996

Related U.S. Application Data

[63] Continuation of Ser. No. 388,578, Feb. 14, 1995, Pat. No. 5,613,920.

[30] Foreign Application Priority Data

Feb. 14, 1994 [JP] Japan .................................... 6-017255

[51] Int. Cl.⁶ .................................................. F16H 59/00
[52] U.S. Cl. ......................................... 477/109; 477/110
[58] Field of Search ................................. 477/109, 110, 477/111

[56] References Cited

U.S. PATENT DOCUMENTS

| | | | |
|---|---|---|---|
| 3,939,738 | 2/1976 | Adey et al. | 477/110 X |
| 4,226,141 | 10/1980 | Espenschied | 477/110 X |
| 4,724,723 | 2/1988 | Lockhart et al. | 477/110 X |
| 4,819,163 | 4/1989 | Shimizu et al. | 477/109 X |
| 5,086,666 | 2/1992 | Moriki | 477/110 X |
| 5,133,227 | 7/1992 | Iwatsuki | 477/110 |
| 5,325,740 | 7/1994 | Zhang et al. | 477/110 |

FOREIGN PATENT DOCUMENTS

| | | |
|---|---|---|
| 0230735A2 | 12/1986 | European Pat. Off. |
| 4210956A1 | 2/1993 | Germany. |

OTHER PUBLICATIONS

Patent Abstracts of Japan for Japanese Laid-Open No. 63-254256, Oct. 20, 1988.
Patent Abstracts of Japan for Japanese Laid-Open No. 1-4544, Jan. 1, 1989.
Patent Abstracts of Japan for Japanese Laid-Open No. 6-317242, Nov. 15, 1994.

*Primary Examiner*—Charles A. Marmor
*Assistant Examiner*—Saúl J. Rodriguez
*Attorney, Agent, or Firm*—Evenson, McKeown, Edwards & Lenahan, P.L.L.C.

[57] ABSTRACT

The invention provides a torque feedback shift control device for an engine control system including an engine, an engine torque controller, an automatic transmission for changing output speed of the engine, and a transmission controller for controlling gear shifting in the transmission. A target torque generator is provided for generating a signal indicative of a target torque pattern in shifting of the automatic transmission according to a shifting signal from the transmission controller. A drive shaft torque detector detects an output torque of the automatic transmission, and the engine controller performs feedback control of the engine torque so that the output torque detected by the drive shaft torque detector in downshifting of the automatic transmission follows up the target torque pattern.

10 Claims, 8 Drawing Sheets

TORQUE FEEDBACK SHIFT CONTROL DEVICE AND METHOD

This is a continuation of application Ser No. 08/388,578, filed Feb. 14, 1995, now U.S. Pat. No. 5,613,920.

BACKGROUND OF THE INVENTION

The present invention relates to a torque feedback shift control device and method, and more particularly to a torque feedback shift control device and method designed to reduce torque fluctuation (shift shock) occurring in shifting in a vehicle with an automatic transmission.

A control device for reducing shift shock is disclosed, for example, in Japanese Patent Laid-open No. 63-254256, wherein an input speed of an automatic transmission (an output speed of a torque converter) becomes an input speed for determination of shift start, so that engine output reduction control for reducing the shift shock is started. Another control device for reducing a shift shock is known from Japanese Patent Laid-open No. 64-4544, for example, wherein it is determined whether or not a shift command is present, and if so, a gear ratio is computed from input and output speeds of an automatic transmission and shift start is determined according to the gear ratio computed.

In the prior art mentioned above, engine torque control and timing control are performed in accordance with a predetermined look-up table provided for each shift position, thereby reducing shift shock in shifting. In such control, engine output is controlled to a value that is predetermined for every operational condition of the transmission; and hence the engine torque can be reduced only by a fixed quantity. Accordingly, it is necessary to preset various control quantities corresponding to various conditions to be considered. As a result, various parts must be tuned, requiring much time and labor and making a complete reduction in shift shock difficult

SUMMARY OF THE INVENTION

The present invention has been achieved in view of the above problems. It is an object of the present invention to provide a torque feedback shift control device and method which eliminates the need for tuning of parts to the greatest extent possible, thereby reducing development cost, including the substantial amount of time and labor which is otherwise required for creation of maps.

It is a further object of the invention to obtain a constantly stable shift characteristic, even when there occurs a change in circumstances such as a change in number of passengers or a variation in load as in hill climbing, so as to reduce shift shock, and improve the shift sensation.

These and other objects and advantages are achieved by the method and apparatus according to the present invention, which provides a torque feedback shift control device including an engine, engine controller for controlling engine torque, an automatic transmission for changing output speed of the engine, and a transmission controller for controlling gear shifting in the transmission. A target torque generator generates a target torque signal indicative of a target torque pattern for shifting of the automatic transmission in response to a shifting signal from the transmission controller, and a drive shaft torque detector detects an output torque of the automatic transmission. The engine controller performs feedback control of the engine torque so that the output torque detected by the drive shaft torque detector follows the target torque pattern during downshifting of the automatic transmission.

The present invention further provides a torque feedback shift control method for reducing torque fluctuation by changing an engine torque in downshifting of an automatic transmission, including the steps of detecting an output torque of the automatic transmission, generating a target torque signal indicative of a target torque pattern in the downshifting, and performing feedback control of the engine torque so that the output torque of the automatic transmission in the downshifting follows the target torque pattern.

The output torque of the automatic transmission and the output torque of the engine may be measured directly by sensors, or may be obtained by computation.

According to the present invention, the target torque generator generates the target torque pattern in downshifting of the automatic transmission according to the shifting signal from the transmission controller, and the engine controller performs feedback control of the engine torque so that the drive shaft torque in the downshifting follows the target torque pattern. Accordingly, it is unnecessary to tune a control quantity of the engine in consideration of every situation; furthermore, ideal torque control in shifting is attainable and development cost can be reduced. Also, a stable shift feeling can be obtained and shift shock can be reduced, even when circumstances have changed.

Other objects, advantages and novel features of the present invention will become apparent from the following detailed description of the invention when considered in conjunction with the accompanying drawings.

Figure 1:
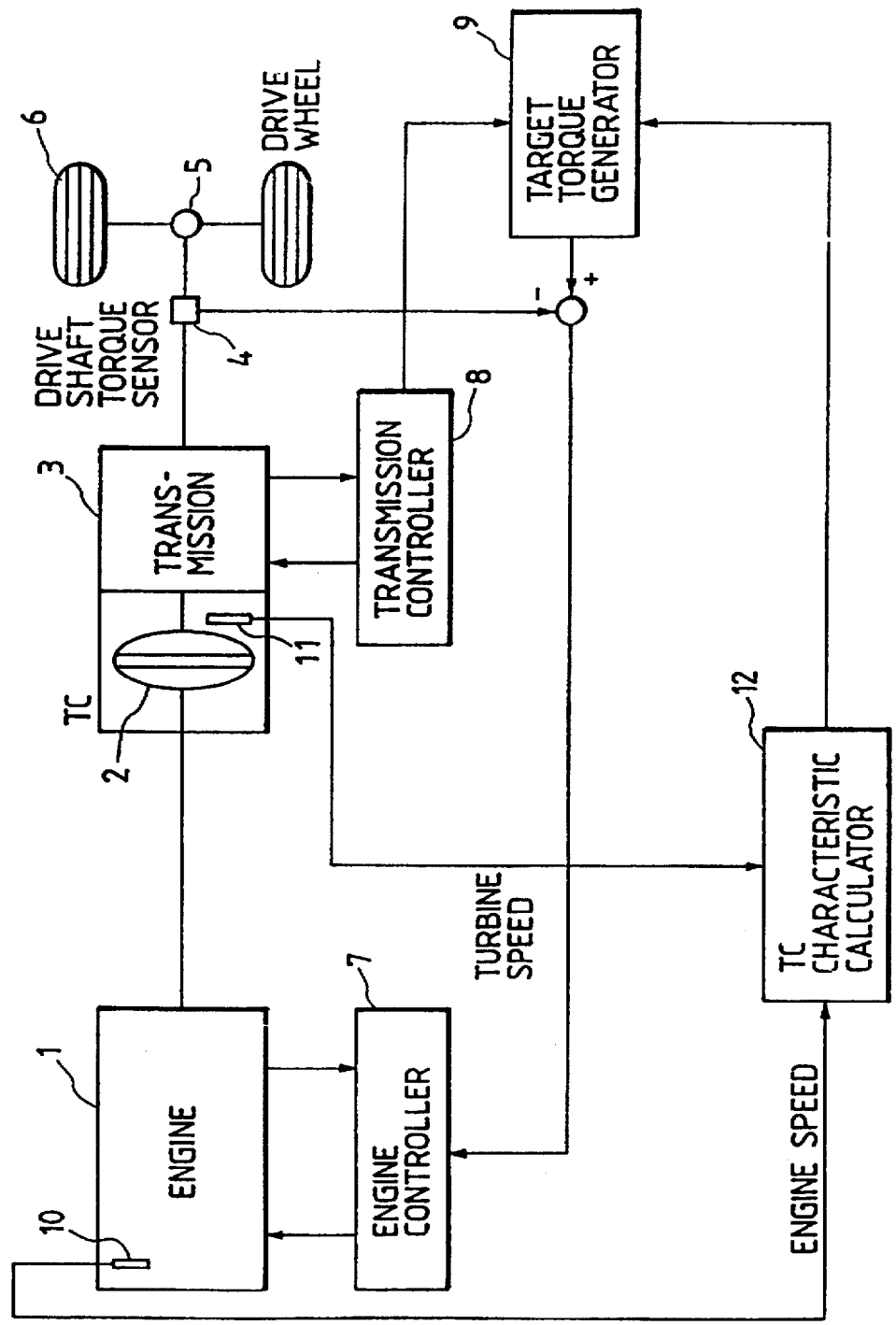
FIG. 1 is a conceptual block diagram showing a first preferred embodiment of a control system according to the present invention.

Referring to the first embodiment of the invention, as shown in FIG. 1, the output torque of an engine 1 is amplified by a torque converter (hereinafter referred to as "TC") 2, and input to a multispeed automatic transmission 3. The automatic transmission 3 changes the rotational speed of the engine 1 to drive tires 6 through a drive shaft torque sensor 4 and a final gear 5. The fuel flow and ignition timing of the engine 1 are controlled by an engine controller 7, and gear shifting of the transmission 3 is controlled by a transmission controller 8.

The engine controller 7 and the transmission controller 8 are included in a feedback loop for controlling the engine 1. That is, there is provided between the engine controller 7 and the transmission controller 8 a target torque generator 9 for generating a target torque signal indicating a target torque pattern required during a shifting period, in response to a shifting signal from the transmission controller 8. The engine controller 7 operates to nullify the deviation between the target torque pattern and a detected torque from the drive shaft torque sensor 4.

As will be hereinafter described in detail, the timing of the starting and ending of the generation of the target torque signal is decided according to a torque ratio t and a pump capacity coefficient c, as explained below. To this end, the engine 1 is provided with an engine speed sensor 10, and the TC 2 is provided with a turbine speed sensor 11. An output Ne from the engine speed sensor 10 and an output Nt from the turbine speed sensor 11 are applied to a TC characteristic computer 12 (FIG. 2), which in turn computes the torque ratio t and the pump capacity coefficient c. Then, the target torque generator 9 generates the target torque signal indicating a target torque pattern determined according to the torque ratio t or the pump capacity coefficient c computed above, with a start value corresponding to the output torque at or immediately before starting of torque feedback control. Selection of an optimum target torque pattern in this manner is based on experimentally predetermined criteria, according to a look up table stored in the target torque generator 9.

The engine controller 7 controls at least one engine operating parameter, such as air intake, fuel intake, and ignition timing, to change the engine torque. Any one of the following control methods for the air system, the fuel system, and the ignition system may be employed to realize the present invention. More practically, the control methods are suitably combined in consideration of circumstances. For example, a control method using an electronically controlled throttle body is well known as a control method for the air system. Although this control method is slow in response, it can control both an increase and a decrease in the engine torque. Further, a method of controlling a fuel injection quantity of an injector is known for controlling the fuel system. Although attention must be paid to an increase in exhaust gas, this control method is quick in response, and has a possibility of improvement in fuel consumption. Further, a method of changing ignition timing to control the ignition system is also known. Although attention must be paid to exhaust gas and knocking, this control method is quick in response and has a wide control range. In particular, this method of changing the ignition timing is effective for a reduction in the engine torque.

Figure 2:
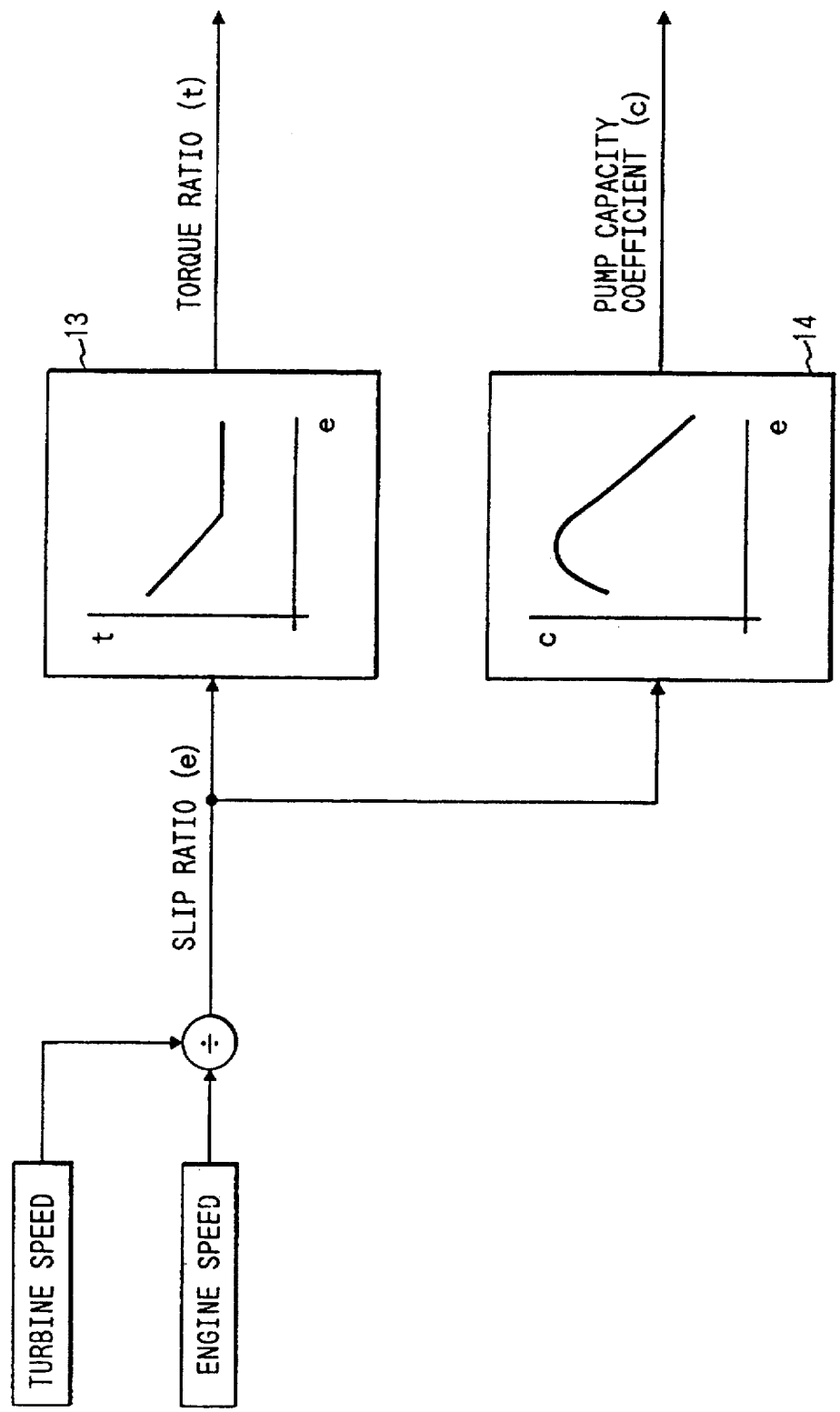
FIG. 2 is a block diagram showing the TC characteristic computation according to the present invention

FIG. 2 is a block diagram showing the operation of the TC characteristic computer 12. The engine speed Ne and the turbine speed Nt determined by the engine speed sensor 10 and the turbine speed sensor 11, respectively, are used to determine a slip ratio signal (e). The latter signal is then used to access a "slip ratio—torque ratio characteristic" preliminarily stored in the TC characteristic computer 12 to obtain the torque ratio t. Similarly, a "slip ratio—pump capacity coefficient characteristic" preliminarily stored in the TC characteristic computer 12 is referred to obtain the pump capacity coefficient c.

Figure 3:
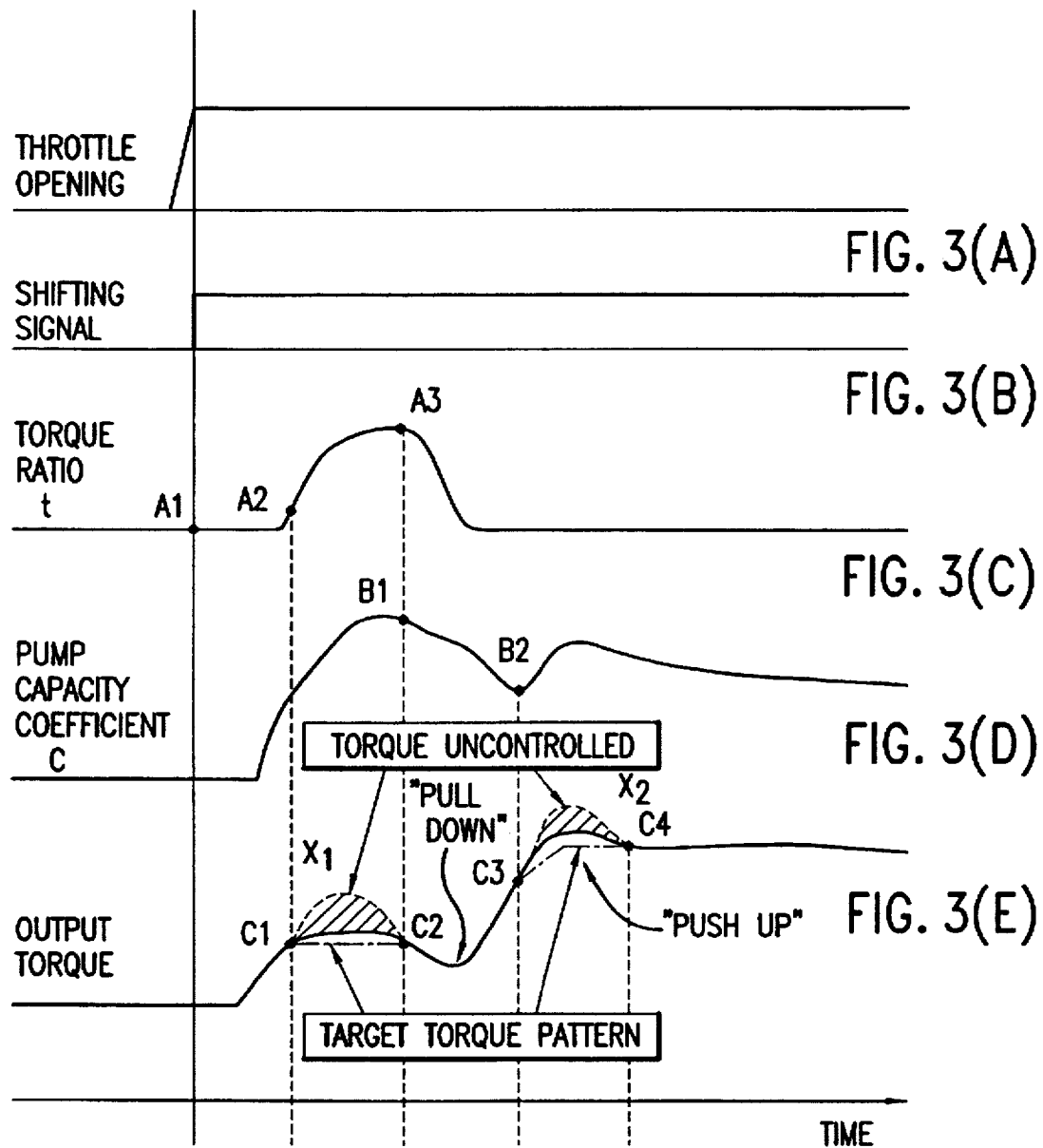
FIG. 3 is a time chart illustrating operation of the invention downshifting.

FIG. 3 is a time chart which illustrates an example of the operation of this preferred embodiment in the case where an accelerator pedal is depressed to downshift the transmission in accordance with a shift schedule.

A TC characteristic is preliminarily stored in the transmission controller 8, and the engine speed Ne and the turbine speed Nt are always measured to simultaneously calculate the torque ratio t and the pump capacity coefficient c from the TC characteristic maps (see FIG. 2). Further, an output torque of the transmission 3 is measured by the drive shaft torque sensor 4.

As shown in FIG. 3, when the accelerator pedal is depressed, a throttle opening (A) is increased and a shifting signal (B) is generated by the transmission controller 8. At this time, as seen in waveform (C), measurement of the torque ratio t is started, and a torque ratio A1 is sampled and held as a reference value for determination of a shift start point.

When the accelerator pedal is depressed, the output torque (E) rises rapidly. After the shifting is started, the output torque falls, and after the shifting is ended, output torque rises again to overshoot and then settle down to a torque after the shifting. Such a fall of the output torque after the start of shifting is usually called "pull-down", whereas such an overshoot after end of the shifting is usually called "push-up".

In general, the "pull-down" and the "push-up" cause a temporary deceleration and a temporary acceleration subsequent thereto during a shifting period, resulting in a feeling of shift shock. The "pull-down" is caused by energy absorption for acceleration of a moment of inertia of a shift mechanism, and it is therefore difficult to eliminate. Accordingly, the torque rise (shown by a hatched area $X_1$ in FIG. 3(E)) occurring before the "pull-down" is suppressed by feedback control in order to suppress the torque fluctuation in this preferred embodiment. On the other hand, the "push-up" may be suppressed by making the torque rise gentle; however, a moderate rise of the torque is necessary from the viewpoint of an acceleration feeling. Accordingly, the overshoot of the torque (shown by a hatched area $X_2$ in FIG. 3) is suppressed by feedback control in order to suppress the torque fluctuation in this preferred embodiment.

The feedback control of the "pull-down" is carried out in the following manner. After the shifting signal (B) is generated, the torque ratio t continues to be measured (C). When a small rise in the torque ratio is detected at point A2, an output torque C1 at this time is sampled and held, and a target torque pattern (shown by a dot-dash line) having a slope of zero in this case, is output from the target torque generator 9, starting at the output torque C1 and ending at an output torque C2, upon ending of the control. Negative feedback control is then performed so as to cause the output torque (E) to follow this target torque pattern, by using a difference between the sampled and held value C1 and the output torque as a deviation, thereby suppressing the output torque. During such control, measurement of the torque ratio t continues. When a decrease in the torque ratio is detected (that is the torque ratio passes beyond a maximum point) at A3, the feedback control started from the point C1 is ended. In this manner, the target torque generator 9 starts and ends the generation of the signal for the target torque pattern according to the torque ratio t determined from the engine speed Ne output from the engine speed sensor 10 and the turbine speed Nt output from the turbine speed sensor 11.

On the other hand, feedback control regarding the "push-up" is carried out in the following manner. Simultaneously with the point C2 when feedback control of the output torque started from the point C1 is ended, measurement of the pump capacity coefficient c (waveform (E)) commences at a point B1. When a minimum value B2 of the pump capacity coefficient c is detected, an output torque C3 at this time is sampled and held. Then, a target torque pattern (shown by a dot-dash line) is generated by the target torque generator 9, having a slope, as shown in the drawing, starting from the output torque C3 and ending at an output torque C4, upon termination of control. Feedback control is performed so as to cause the output torque (E) to follow this target torque pattern, by using a difference between the sampled and held value C3 and the output torque as a deviation, thereby suppressing the output torque. In this control, a counter is operated at starting of the control, and when a predetermined period of time has elapsed, the control is ended. In this manner, the target torque generator 9 ends the generation of the target torque signal according to the pump capacity coefficient c determined from the engine speed Ne output from the engine speed sensor 10 and the turbine speed Nt output from the turbine speed sensor 11.

Figure 4:
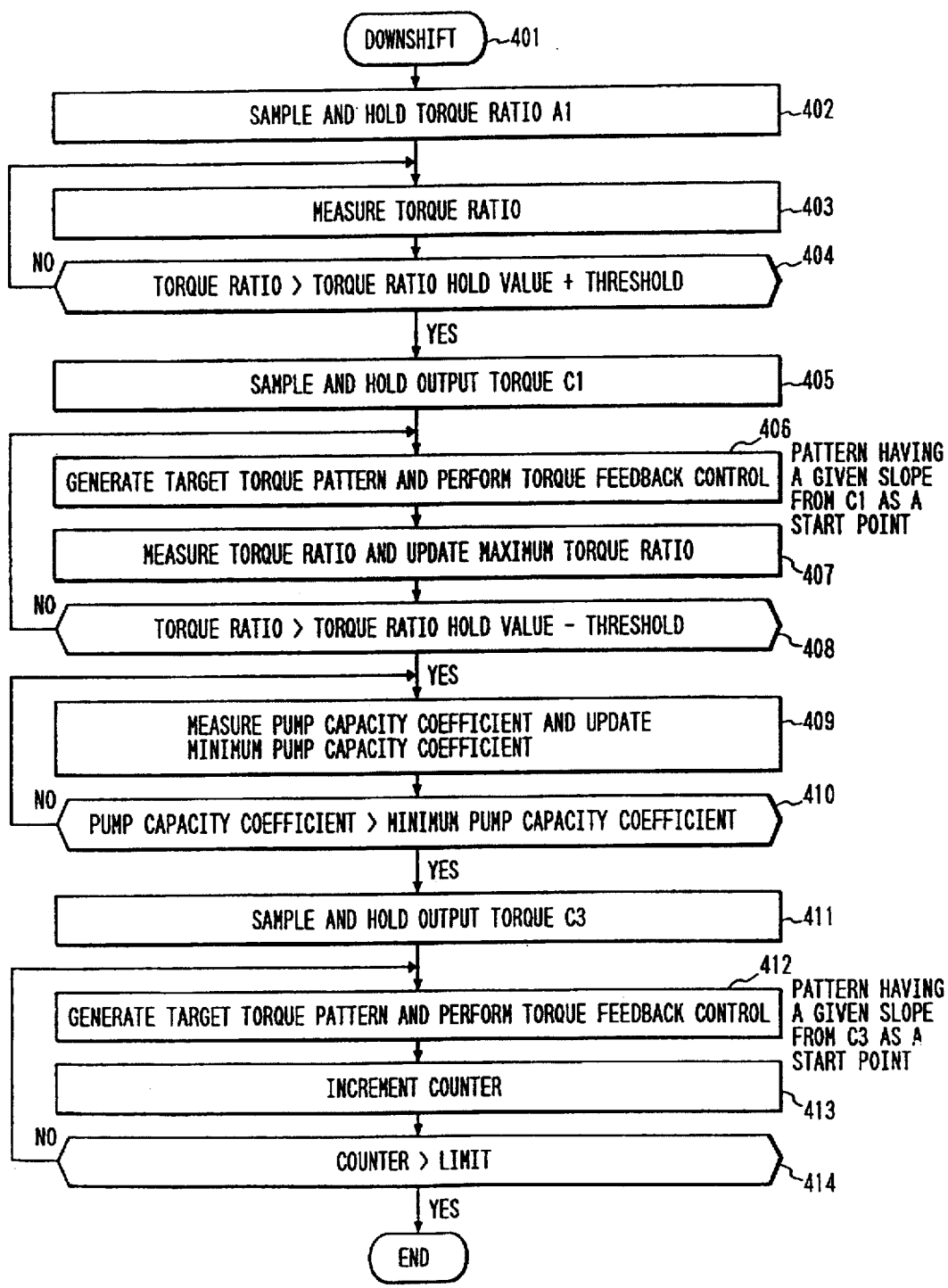
FIG. 4 is a flowchart showing a procedure for shift control.

FIG. 4 is a flowchart showing an example of feedback controls mechanism for suppressing the "pull-down" and the "push-up" in downshifting the transmission, as shown in FIG. 3. Referring to FIG. 4, in step 401 a downshift occurs, and the torque ratio A1 (FIG. 3) is sampled and held at step 402. Thereafter, the torque ratio continues to be measured at step 403, and is compared in step 404 with a threshold value A2, which is set slightly higher than the sampled torque ratio A1. When the measured torque ratio t exceeds the threshold A2, the output torque (waveform (E)) is sampled and the measured value C1 is held in a memory (step 405). Thereafter, a target torque pattern determined according to the torque ratio t or the pump capacity coefficient c, and having an initial value equal to the sampled output torque value, commences at point C1, and is used for performing negative feedback control of the output torque at step 406.

At step 407, a maximum value of the torque ratio t (which continues to be measured) is determined, a threshold A3 slightly less than the maximum is set. Thereafter, at step 408, the torque ratio t is compared with the set threshold value A3, and when it becomes equal to or less than the set value, "pull-down" control is ended.

In step 409, a minimum value B2 of the pump capacity coefficient c (which continues to be updated) is measured, and a minimum value B2 is identified. The measured pump capacity coefficient c and the stored minimum value are then compared at step 410, and when the measured value exceeds the minimum, the output torque C3 is sampled and held at step 411. A target torque pattern is then generated (step 412) having a given slope and starting from the output torque C3, to perform feedback control. At step 413, a clock is started, and after the expiration of a predetermined period (step 414) feedback control for the "push-up" is ended.

According to this preferred embodiment, feedback control according to the target torque pattern is also performed during shifting. Accordingly, it is unnecessary to tune a quantity of fluctuation in engine torque at every shifting and to set a map, as in the prior art. As a result, time and labor for development of a new type of automobile can be greatly reduced.

Other preferred embodiments of the present invention will be described with reference to FIGS. 5 to 8. In each preferred embodiment to be described later, parts having the same functions as those in the first preferred embodiment shown in FIG. 1 are denoted by the same reference numerals, and further explanation thereof will be omitted, with only the differences explained. Further, the control method in each preferred embodiment in FIGS. 5 to 8 is the same as that shown in FIGS. 2 to 4, and explanation thereof will also be omitted.

Figure 5:
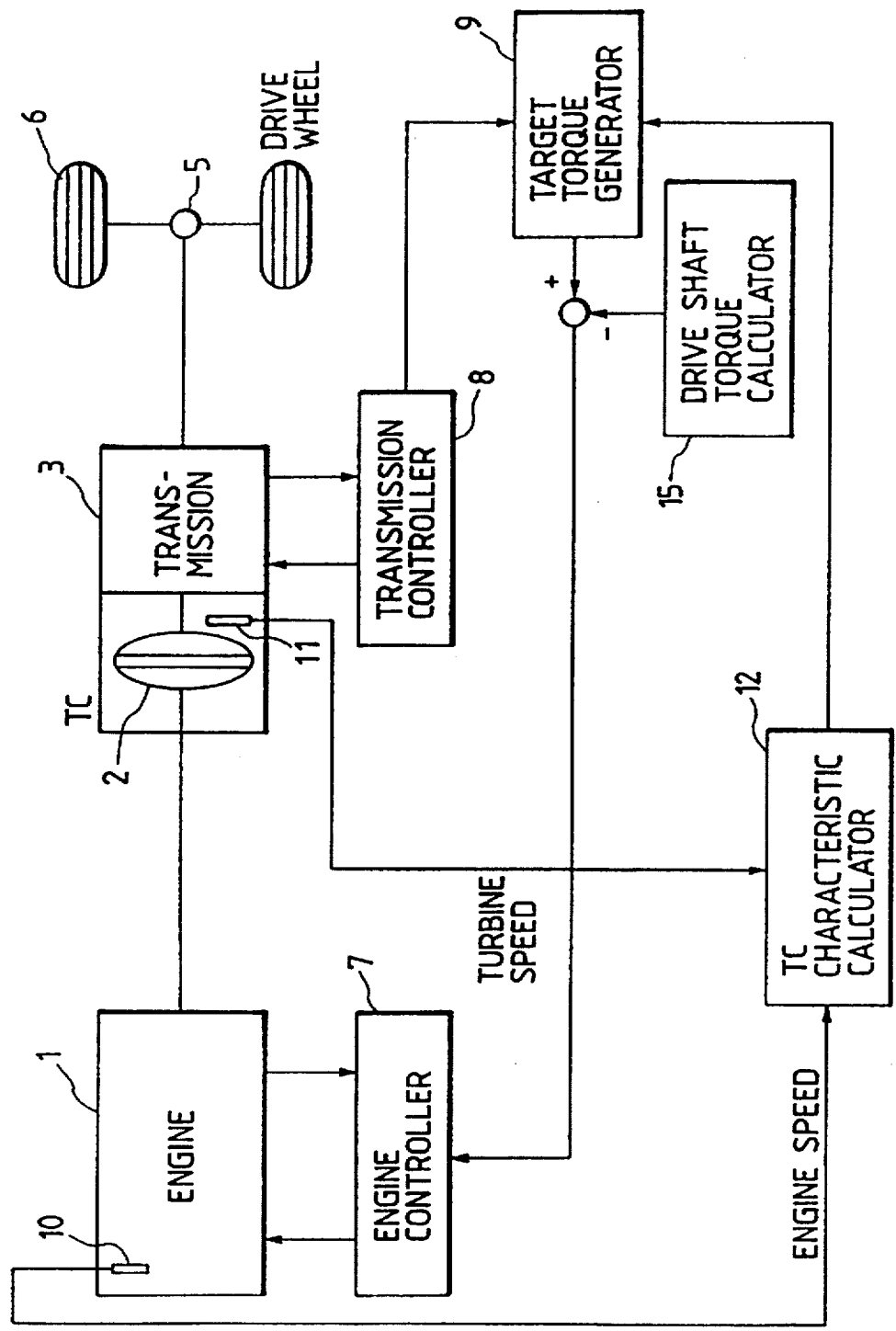
FIG. 5 is a block diagram showing a second preferred embodiment of a control system according to the present invention.

FIG. 5 is a control block diagram according to a second preferred embodiment of the present invention, which differs from that shown in FIG. 1 in that a drive shaft torque calculator 15 is provided to detect the output torque of the transmission 3, in place of the drive shaft torque sensor 4 shown in FIG. 1. The other parts are the same as those in FIG. 1. A drive shaft torque To can be obtained by calculation from detected values of engine speed, turbine speed, slip ratio of the TC 2, and gear ratio of the transmission 3. Thus, feedback control can be performed without the need of actually providing a drive shaft torque sensor 4. Accordingly, this preferred embodiment can be constructed more economically than that shown in FIG. 1.

As known in the art, the drive shaft torque To can be obtained from the following equations (1) and (2).

$$Ne^2 \cdot c \cdot t = Tt \qquad (1)$$

$$Tt \cdot R = To \qquad (2)$$

where,

Ne: engine speed c: pump capacity coefficient t: torque ratio

Tt: turbine torque

R: gear ratio

Figure 6:
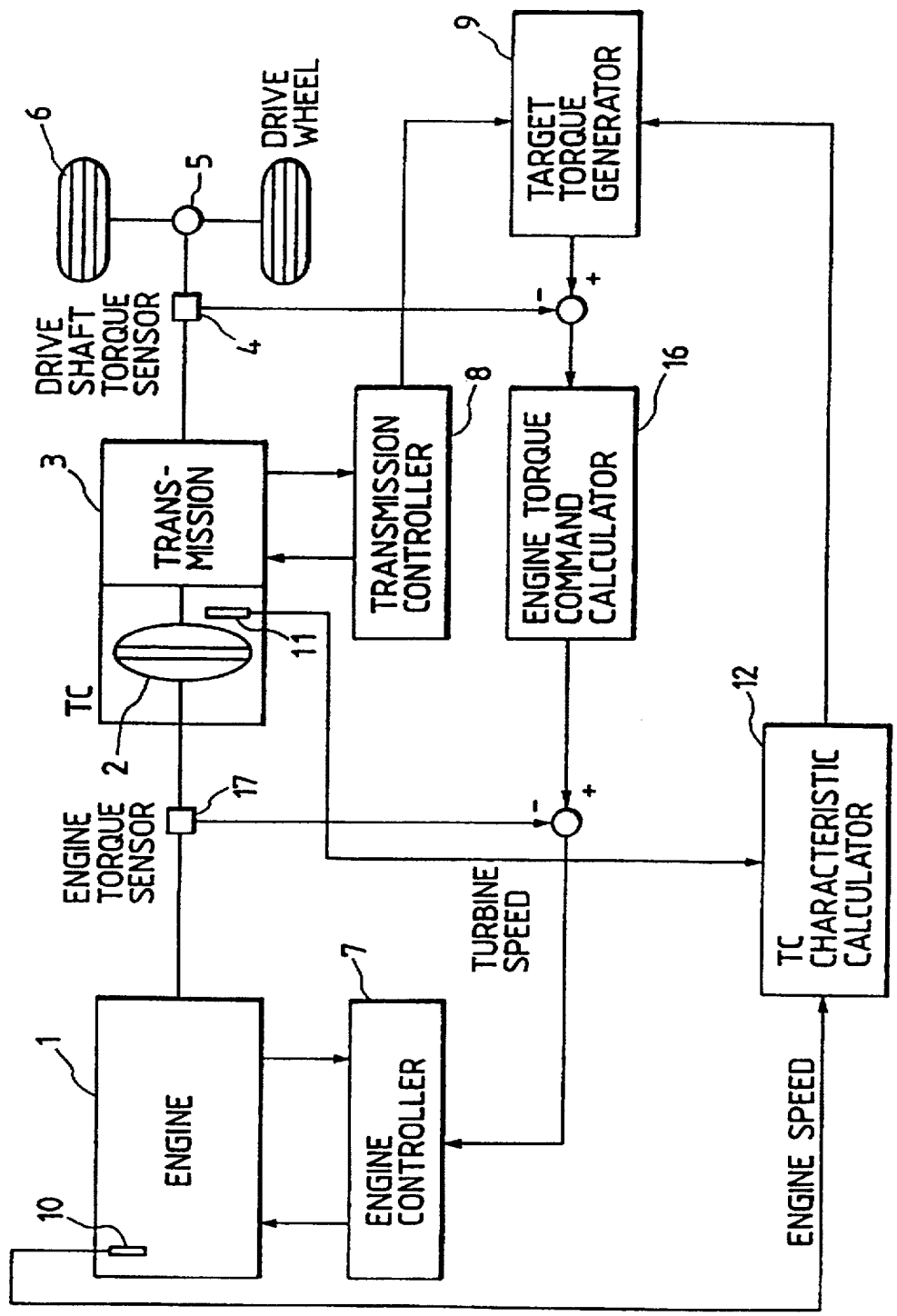
FIG. 6 is a block diagram showing a third preferred embodiment of a control system according to the present invention.

FIG. 6 is a control block diagram of a third preferred embodiment of the present invention. The system shown in FIG. 6 is different from that shown in FIG. 1 in that an engine torque sensor 17 is used to detect the output torque of the engine, forming a minor feedback loop for the engine torque. Furthermore, an engine torque command calculator 16 is provided to calculate an engine torque command to control the torque generated by the engine according to a deviation between an output from the target torque generator 9 and an output from the drive shaft torque sensor 4. The engine controller 7 compares the engine torque command output from the engine torque command calculator 16 with the output from the engine torque sensor 17, and controls the engine 1 so as to nullify any deviation between them. According to the method of this preferred embodiment, the minor loop for control of the engine torque allows fine and highly accurate control of the engine torque. Furthermore, the engine torque command is calculated from the deviation between the drive shaft torque and the target torque, and the engine torque is controlled according to the engine torque command thus calculated. Accordingly, stable control can be performed despite the presence of a nonlinear component such as a TC.

Figure 7:
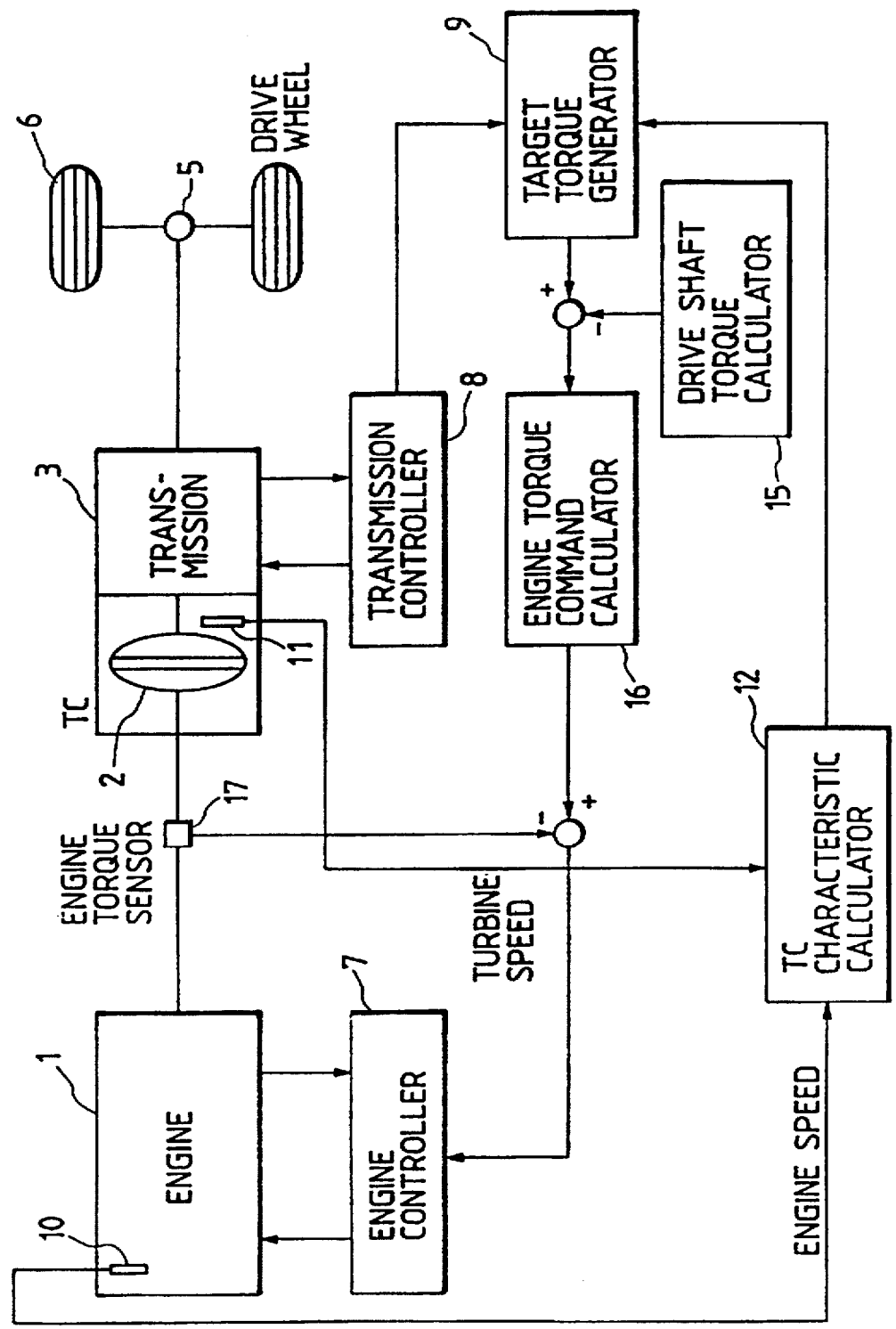
FIG. 7 is a block diagram showing a fourth preferred embodiment of a control system according to the present invention.

FIG. 7 is a control block diagram of a fourth preferred embodiment of the present invention, which is constructed by adding the drive shaft torque calculator 15 shown in FIG. 5 to the control system shown in FIG. 6. Accordingly, this preferred embodiment is economical in that it can be constructed at less cost than that of the third preferred embodiment.

Figure 8:
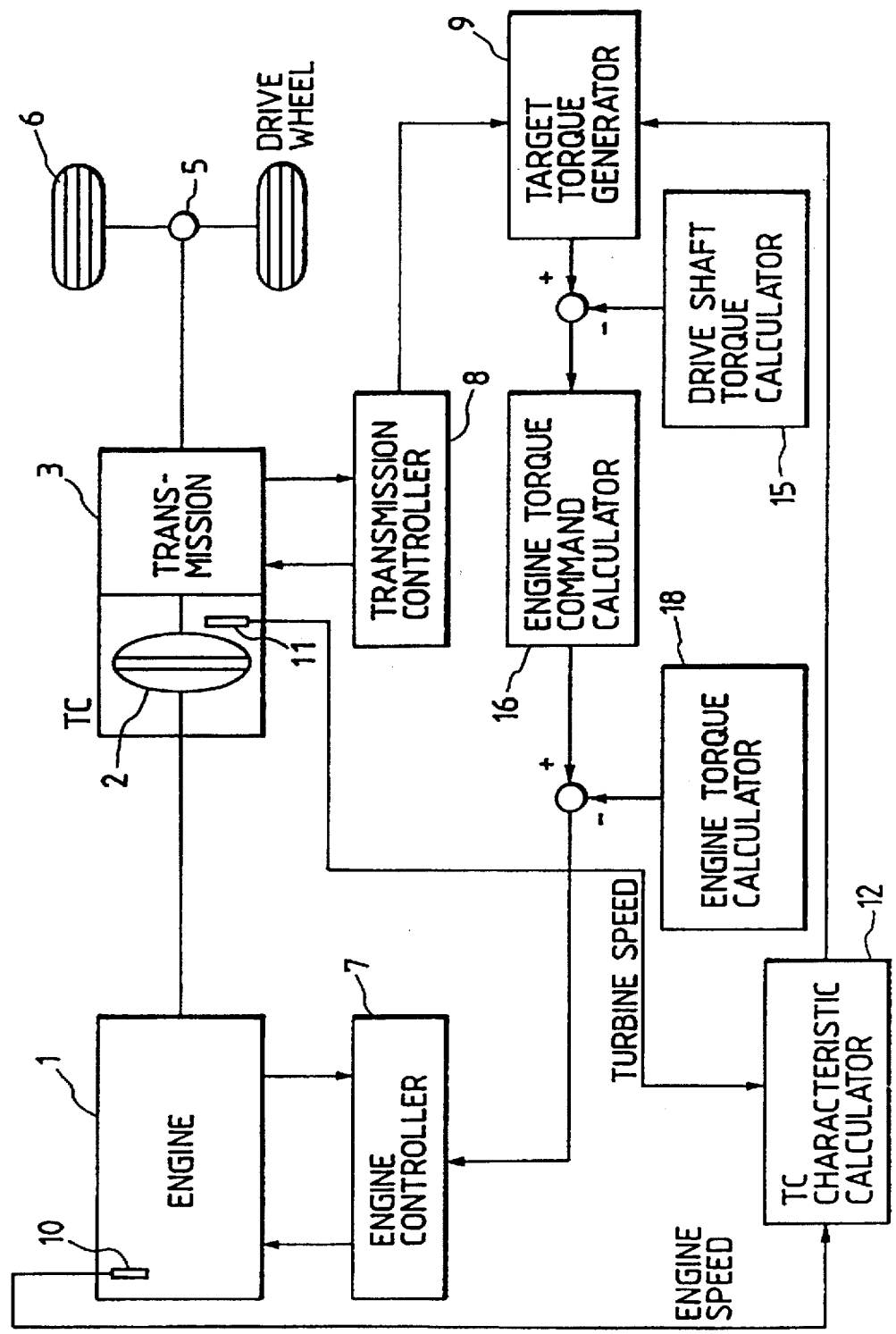
FIG. 8 is a block diagram showing a fifth preferred embodiment of a control system according to the present invention.

FIG. 8 is a control block diagram of a fifth preferred embodiment of the present invention, which differs from that shown in FIG. 7 in that an engine torque calculator 18 is substituted as the engine torque detector for detecting the output torque of the engine, in place of the engine torque sensor 17. Engine torque Te can be obtained by calculation from an engine speed Ne and a slip ratio e as shown in the following equation (3). A minor loop for control of the engine torque can be realized without the need of actually providing the engine torque sensor 17. Accordingly, this preferred embodiment can be constructed at even less cost than that shown in FIG. 7.

$$Tt/e = Te \qquad (3)$$

As understood from the above description, according to the present invention the engine output torque is feedback-controlled during shifting, so as to follow a target torque. Accordingly, the need for timing of parts is eliminated to the greatest extent possible, thereby reducing development costs, including a large amount of time and labor otherwise required for creation of maps. Furthermore, even when there occurs a change in circumstances such as a change in number of passengers and a variation in load (as in hill climbing), a consistently stable shift characteristic can be obtained because target torque feedback control is performed. Further, shift shock can be reduced and the shift sensation can be improved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said target torque generator generates said signal of said target torque pattern according to a torque ratio of said engine and automatic transmission, and having a start value corresponding to said output torque of said automatic transmission at or before starting of said torque feedback control.

2. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback signal control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said target torque generator generates said signal of said target torque pattern according to a pump capacity coefficient of said engine and automatic transmission, and having a start value corresponding to said output torque of said automatic transmission at or before starting of said torque feedback control.

3. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said target torque generator starts or stops generating said signal of said target torque pattern based on a torque ratio determined from an engine speed and turbine speed.

4. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said target torque generator stops generating said signal of said target torque pattern based on a pump capacity coefficient determined from an engine speed and a turbine speed.

5. A torque feedback shift control device for use in a vehicle having an engine for generating an engine torque, an automatic transmission for changing an output speed of said engine and for generating an output torque, and a transmission controller for controlling shifting of gears in said automatic transmission and for generating a shifting signal, said torque feedback shift control device comprising:

an engine torque detector for detecting said output torque of said engine;

a target torque generator for generating a signal of a target torque pattern for shifting of said automatic transmission, in response to a shifting signal from said transmission controller;

an engine torque command value calculator for calculating an engine torque command value for controlling said engine in accordance with said target torque pattern; and an engine controller for performing feedback control of said engine torque so that said output torque of said engine approaches said torque command value in downshifting operation of said automatic transmission.

6. A torque feedback shift control device for use in a vehicle having an engine for generating an engine torque, an automatic transmission for changing an output speed of said engine and for generating an output torque, and a transmission controller for controlling shifting of gears in said automatic transmission and for generating a shifting signal, said torque feedback shift control device comprising:

an engine torque calculator for calculating said output torque of said engine;

a target torque generator for generating a signal of a target torque pattern for shifting of said automatic transmission, in response to a shifting signal from said transmission controller;

an engine torque command value calculator for calculating an engine torque command value for controlling said engine in accordance with said target torque pattern; and an engine controller for performing feedback control of said engine torque so that said output torque of said engine approaches said engine torque command value in downshifting operation of said automatic transmission.

7. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said feedback control comprises an engine torque command calculator for calculating an engine torque command value for controlling said engine such that said output torque approaches said target torque pattern in downshifting operation of said automatic transmission; and wherein said target torque generator generates said signal of said target torque pattern according to a torque ratio of said engine and automatic transmission, and having a start value corresponding to said output torque of said automatic transmission at starting or before starting of said torque feedback control.

8. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said feedback control comprises an engine torque command calculator for calculating an engine torque command value for controlling said engine such that said output torque approaches said target torque pattern in downshifting operation of said automatic transmission; and wherein said target torque generator generates said signal of said target torque pattern according to a pump capacity coefficient of said engine and automatic transmission, and having a start value corresponding to said output torque of said automatic transmission at starting or before starting of said torque feedback control.

9. A torque feedback shift control device for use in a vehicle having an engine for generating an engine torque, an automatic transmission for changing an output speed of said engine and for generating an output torque and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said feedback control comprises an engine torque command calculator for calculating an engine torque command value for controlling said engine such that said output torque approaches said target torque pattern in downshifting operation of said automatic transmission; and wherein said target torque generator starts or stops generating said signal of said target torque pattern according to a torque ratio determined from an engine speed and a turbine speed.

10. A torque feedback shift control device for use in a vehicle having an engine for generating an engine torque, an automatic transmission for changing an output speed of said engine and for generating an output torque, and a transmission controller for controlling shifting of gears in said automatic transmission and for generating a shifting signal, said torque feedback shift control device comprising:

a target torque generator for generating a signal of a target torque pattern for shifting of said automatic transmission, in response to said shifting signal from said transmission controller; and an engine controller for performing feedback control of said engine torque so that said output torque approaches said target torque pattern in downshifting operation of said automatic transmission;

wherein said feedback control comprises an engine torque command calculator for calculating an engine torque command value for controlling said engine such that said output torque approaches said target torque pattern in downshifting operation of said automatic transmission; and wherein said target torque generator stops generating said signal of said target torque pattern according to a pump capacity coefficient determined from an engine speed and a turbine speed.

* * * * *